March 26, 1963  R. P. C. CARCASSONNE-LEDUC  3,083,102
PROCESS FOR PRE-COOKING RICE Filed June 17, 1958  5 Sheets-Sheet 1

Fig.1

INVENTOR
Roger Paul Charles Carcassonne-Leduc
BY
Pollard, Johnston, Snyder & Robertson
ATTORNEYS March 26, 1963   R. P. C. CARCASSONNE-LEDUC   3,083,102
PROCESS FOR PRE-COOKING RICE Filed June 17, 1958   5 Sheets-Sheet 2

INVENTOR
Roger Paul Charles Carcassonne-Leduc
BY
Pollard Johnston, Smythe and Robertson
ATTORNEYS 3,083,102
PROCESS FOR PRE-COOKING RICE
Roger Paul Charles Carcassonne-Leduc,
25 Rue Rennequin, Paris, France
Filed June 17, 1958, Ser. No. 742,652
Claims priority, application France Aug. 17, 1955
2 Claims. (Cl. 99—80)

The present invention relates to the industrial cooking of edible granular particles, such as, for example, rice, beans, lentils, tapioca, semolina, corn and the like.

This application is a continuation-in-part of my application Serial No. 598,392, filed July 17, 1956, now abandoned.

In prior practice, such edible products have been pre-cooked on an industrial scale and then dried to produce a product which the consumer could rehydrate and cook rapidly so that the product could be placed in an immediately consumable condition. In some instances the cooking could be accomplished by merely warming the edible product. Thus, in some countries, there has been on the market a pre-cooked rice which can be correctly prepared by the consumer by soaking the rice in several times its own volume of water, boiling the rice for two or three minutes and then allowing the rice to stand in the cooking water for five to ten minutes. It is even possible without cooking to obtain a rice which can be eaten cold, such as in a salad, by soaking said pre-cooked rice in several times its own volume of water. Generally, the processes used in such industrial cooking have consisted of allowing the product to be treated to soak in water for a certain period, then transferring it directly to a cooking chamber and cooking it therein by means of either water or steam. Thereafter, the cooked product, having undergone agitation, if necessary, i.e. a separation of at least part of the grains, is subjected to drying to bring it to the required degree of dryness for conditioning and subsequent placing on the market.

Such an industrial cooking, of say rice, sometimes meets with serious difficulties if it is desired to obtain both a suitable yield and a product of acceptable quality. In fact, the starch which is in the vicinity of the surface of the grains and which is only partially eliminated by the soaking water, causes the formation of a paste which has a tendency to transform the rice during its cooking and subsequent handling into an agglomerated mass which is difficult to process, even if this cooking is carried out as correctly as possible. Further, the agitation or separation of the rice grains, whether done immediately after cooking or after drying to the degree required for conditioning, gives rise to numerous breakages of the grains and the grains thus broken must be sorted out and eliminated, and this considerably decreases the commercial yield of the operation.

One of the objects of the present invention is to provide a process for the industrial cooking of edible products, a process for the industrial cooking of edible products, and more particularly of rice, which overcomes these drawbacks, and to obtain, with a very high yield, a product having excellent merchandizing qualities.

Another of the objects of the invention is to provide an improved apparatus for industrial cooking and treating of edible products, more particularly rice.

In carrying out the invention, the rice or other edible product can be pre-cooked and then dried and the grains separated when the rice is in such a condition that proper separation will take place. This can be accomplished by a single initial drying to a predetermined degree, separation, and a single final drying, or by a plurality of dryings, each drying being to a predetermined degree and with interposed agitation or separation between drying zones.

According to one aspect of the invention, the process may include the following steps: Allowing a mass of the product to soak in water for a predetermined time, draining off excess water over such a period as will allow diffusion of the water throughout the mass, cooking the mass by passing steam at atmospheric pressure through the mass also for a predetermined time depending on the product, initially drying said mass without agitation to reduce the humidity of said mass only to such a degree that it can readily be handled without risk of damage, agitating the initially dried mass to separate the grains and to break down the mass.

According to one embodiment of the method, the initially dried mass can be broken down and agitated while falling substantially vertically and thereafter formed into a thin layer which is subjected to the final drying by any convenient means, e.g. by means of a stream of hot air passed through said thin layer and through the perforated belt. It is, however, preferable to subject directly the initially dried mass to various raking and agitating actions calculated to ensure an increasingly fine stirring of the layer until it attains a state of division which substantially corresponds to the condition of completely separated grains, while continuing to pass the drying air during and between the said successive raking operations until the said treated product has reached the degree of dryness required for its conditioning.

Preferably, when the product to be treated is rice, the soaking period is approximately half the draining period, e.g. 10 to 15 minutes for soaking, and approximately 30 minutes for drainage.

The cooking may be by means of a stream of free steam, which is considered herein as steam at approximately atmospheric pressure, which is passed through the layer of the product to be processed, either upwards or downwards or alternately in one direction and then in the other. The same thing may hold for the air stream used to partially and/or finally dry the layer of cooked product.

Preferably, apparatus for the continuous operation of the process includes an endless vapor permeable conveyor belt, the belt being arranged to pass through both a cooking and a drying chamber or zone. The length of the paths of the belt in the cooking and in the initial drying chambers is proportional to the times desired for cooking and for initially drying the substance. According to one embodiment, said vapor permeable belt may then discharge the rice into an agitating device which in turn may discharge onto a second conveyor belt. The second conveyor belt preferably passes through a chamber in which the product is finally dried.

According to another embodiment, there are a plurality of controlled drying and agitation or separation zones. The initial drying chamber can be extended lengthwise in such a manner that its length calculated as a function of the speed of travel of the conveyor belt is such that the product treated has the degree of dryness required for its conditioning at the outlet of the said drying chamber, said chamber contains a series of fixed transverse combs distributed over the length of the chamber, starting from a point situated at a predetermined distance from the entry of the said drying chamber. Each of said fixed combs comprises vertical teeth arranged in a plane substantially transverse to the conveyor belt and arranged so as to extend from the top to the bottom through the layer of the product to be treated to the immediate vicinity of the surface of the conveyor belt. The fixed combs co-operate with a moving comb formed by teeth fixed on a shaft rotatably mounted inside of the drying chamber, the moving comb teeth being arranged so as to engage between the teeth of the fixed corresponding comb. The moving comb teeth extend to the vicinity of the surface of the conveyor belt, the distance between the teeth of a fixed comb and the corresponding moving comb being substantially the same and being progressively reduced from one assembly of fixed and moving combs to that next in series in the direction of travel of the conveyor belt.

According to still another embodiment, the plurality of controlled drying and agitation or separation zones include various types of rotary stirring devices which are designed to progressively break up the layer on the perforated belt into smaller and smaller masses and finally into discrete particles.

According to one feature of this invention, the conveyor belt is divided into at least three separate belts having independent speeds of movement and corresponding, respectively, to the operations of soaking and draining, to a rest period for water absorption, and to the operations of cooking and drying. With such an arrangement it is possible to vary the period of time for each step in the process to permit the same apparatus to be used, without modification, with various edible products such as cereals, dried vegetables and tapioca.

In order to increase the flexibility of the apparatus, the cooking chamber and the drying chamber may each include at least two compartments, each of which is an individual chamber. Thus, by putting different sets of compartments into operation, different operations can be performed on different products.

These and other objects, advantages and features of the invention will become apparent from the following description and drawings, which are merely exemplary.

Figure 1:
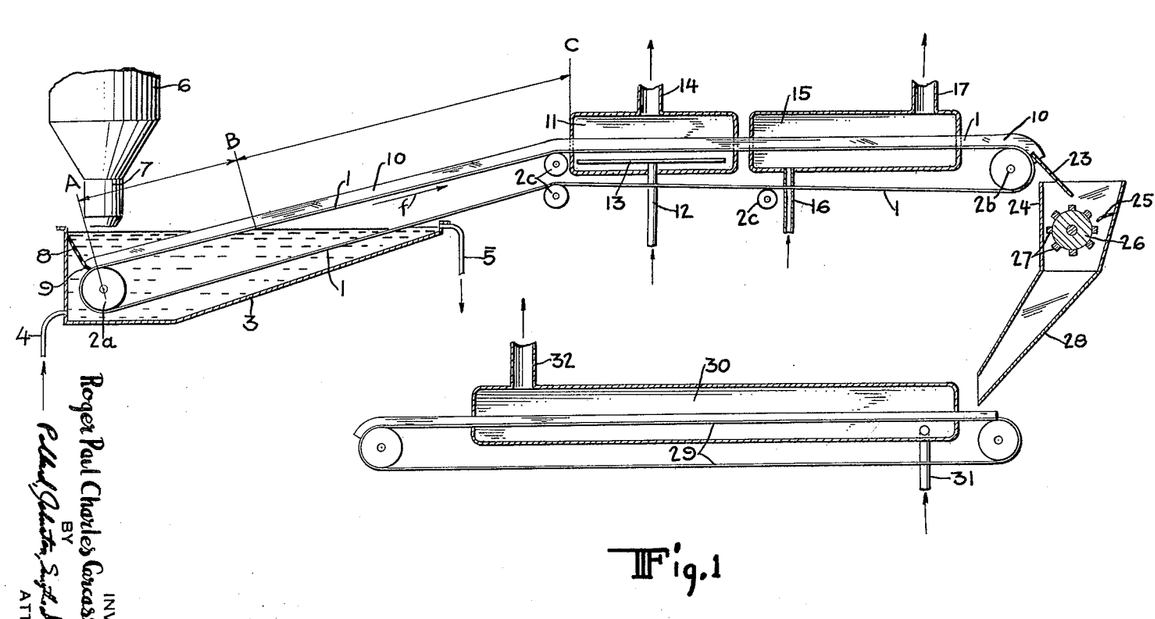
FIG. 1 is a diagrammatic longitudinal section of an apparatus for carrying out the invention.

In the form seen in FIG. 1, the apparatus includes an endless conveyor belt 1, passing over terminal rollers 2a and 2b, the roller 2b being driven by a motor, not shown, which ensures the motion of the belt in the direction of the arrow f, and over intermediate guiding rollers such as 2c. The belt may consist of a flexible stainless steel sheet perforated with holes, the diameters of which are of the order of 1.5 to 2 mm.; or again of a series of stainless steel plates, perforated with holes of the same order of size, and articulated with one another, the rollers 2a and 2b then being rollers with flat portions. The belt 1 comprises an oblique portion AC and a horizontal portion.

Part of the oblique portion of the belt 1, as well as the roller 2a, dip into a tank 3 provided, at its lower portion, with a water inlet duct 4 and, at its upper portion with an overflow duct 5. Above the end of the belt 1 which dips into the tank 3, a hopper 6 is arranged, provided with an electro-magnetic power supply 7 of a known type, for receiving the rice to be processed. A transverse plate 8, provided, at its lower edge, with a flexible lip 9 in contact with the upper strand of the belt 1, is arranged inside the tank 3 for preventing the rice which falls from the hopper 6 onto the belt 1 from slipping off the belt 1 backwards into the tank 3. Continuous side plates 10 are arranged on each side of the upper strand of the belt 1, in close contact with the upper face of said strand, for holding the rice laterally thereof.

When horizontal, the upper strand of the belt 1 goes through a cooking chamber 11, which may be parallelepipedal in shape, said chamber being provided, at its lower portion with a live or free steam inlet duct 12, feeding distributing ducts or pipes 13, and with an outlet flue means 14. The upper strand of the belt 1 then may pass through an initial drying enclosure 15, of a parallelepipedal or similar shape chamber, which is provided at its lower portion with a hot air inlet duct 16 and at its upper portion with an outlet flue or duct 17.

The cooking chamber 11 (or the pre-drying chamber 15) may comprise, at its lower portion (FIGS. 2 and 3), a steam (or air) distribution vat 11a in which are arranged the steam ducts 13 (or in which the hot air inlet duct 16 opens, see FIG. 1), and at its upper portion a receiving hood 11b from which the outlet 14 (or 17) leads. The vat 11a and hood 11b are provided with flanged edges so that they can be tightly coupled together, joining and spacing strips 18 and a flanged edge 10a of a portion of the side plates 10 being interposed between them when they are so coupled. In the cooking enclosure 11, pipes 19 opening at the bottom of the vat 11a and at the bottoms of the spaces left between the side walls of the hood 11b and the side plates 10 are provided for allowing the evacuation of the condensates. At each end, the enclosure 11 (or 15) is closed by a transverse wall 20 (FIG. 3) in which an aperture 21 has been left, allowing the passing of the upper strand of the air permeable belt 1 with the rice layer overlying it, the upper edge of this aperture being provided with a flexible lip 22 arranged so as to press slightly on the rice layer carried by the belt 1, thus ensuring the necessary or desired compactness of the layer.

Figure 2:
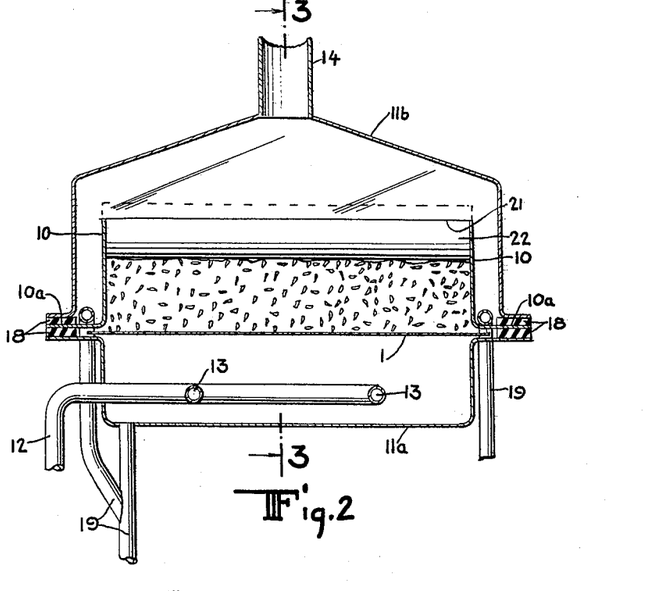
FIG. 2 is a longitudinal section of one end of a cooking or drying chamber.
Figure 3:
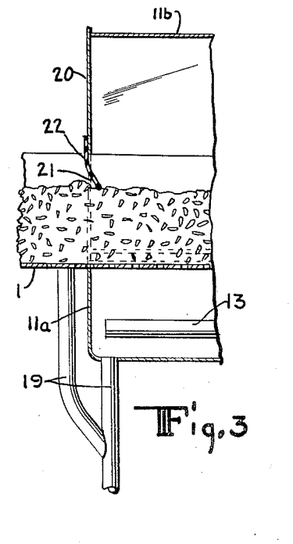
FIG. 3 is a cross-sectional view looking in the direction 3—3 of FIG. 2.

The respective positions of the vat 11a and hood 11b may, in the case of the cooking enclosure as in that of the pre-drying enclosure, be interchanged (not shown), the vat being above and the hood below, with a corresponding interchange of the ducts 12 and 14 (or 16 and 17), for passing the steam (or air) downwards instead of upwards. In addition, two cooking (or pre-drying) enclosures (not shown) may be provided, adjacent to each other, end to end, one of these enclosures receiving steam (or air) from below and evacuating it above, and the other one receiving it from above and evacuating it below.

Figure 4:
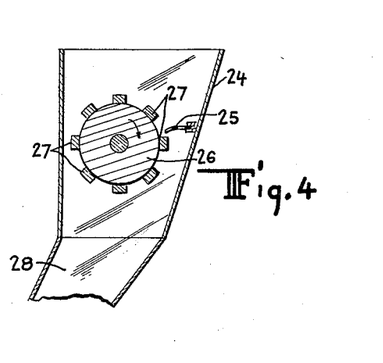
FIG. 4 is an enlarged fragmentary sectional view of the agitating device.

A plate 23 (FIG. 1) is located adjacent the portion of the belt 1 which passes over driving roller 2b, plate 23 acting as a scraper and delivering rice from the belt 1 to the grain separating or agitating device. The agitating device (FIGS. 1 and 4) consists of a chute 24 having a flexible blade 25 protruding from the interior thereof, said blade being adapted to co-act with teeth 27 or a driven rotary cylinder 26. In the form shown, the blade is substantially horizontal.

Channel 28 extends from the lower portion of the chute 24 of the grain separating device to above a second conveyor belt 29, the upper strand of said belt 29 passing through an enclosure 30 for the final drying. This second belt 29 and the corresponding enclosure 30 are preferably wider than the belt 1 and the enclosures 11 or 15, so as to allow the spreading of the rice in a still thinner layer. A device, of a known type (not shown), is provided for distributing the rice from the channel 28 over the width of the belt 29. The final drying chamber 30 consists of a tight box provided with apertures through which belt 29 passes, hot air being introduced through a duct 31 leading to distributing conduits (not shown) which extend along the side walls and along the bottom of the said chamber 30, while an outlet 32 is provided for removal of air or drying medium after it has passed through the rice layer.

The raw rice, having an initial water content of about 14–16%, is placed in the hopper 6, and then discharged in a continuous manner by previously activated feed 7 onto air permeable belt 1 to form a layer approximately 10 cm. thick, the feed 7 being adjusted to provide the desired thickness. Side plates 10 prevent losses of material on the sides, and help to maintain the initial thickness of the layer. The rice, which is carried by the perforated belt 1, remains immersed in water for 10 to 15 minutes, during the run A—B of the belt. The run B—C lasts about 20 minutes, rice draining during this time and absorbing water which diffuses in a uniform manner to the core of each grain. After this rest period, the layer of rice, which now has a water content of about 20–25%, reaches enclosure 11 in which the cooking of the rice is effected. During cooking, the free steam, which is steam at approximately atmospheric pressure, raises the rice and the water to the boiling point of the latter and this constitutes only a heating means and maintains the humidity of the grains, the water content increasing by 3–5%.

After it has undergone this cooking, the rice layer without being disturbed in any manner whatsoever, enters, with the perforated belt 1, the pre-drying enclosure 15, into which hot air is introduced at a temperature of approximately 90° C. This drying brings the rice to the optimum degree of humidity and it then has a water content of about 18–20%. It is then agitated. In the agitating device, the rice grains, which are generally slightly agglomerated but perfectly friable, are easily and completely separated from one another without breaking any grains.

The rice is then distributed over the belt 29, in a thin layer of about 5 cms. thickness and passed into the final drying chamber 30. Here the rice is subjected to drying by air of a temperature of about 80° C. and this drying lowers its water content to about 10–12%.

The time necessary for soaking, draining, cooking and drying are relative but they may be varied in absolute values by varying the speed of the belts 1 and 29. The desired time for cooking is one of the fundamental factors and the time taken for the rice to pass through the chamber 15 may be predetermined, since one can vary the temperature of the steam introduced therein.

All the processing operations, i.e. soaking, standing, cooking and drying, are thus effected mecahnically and automatically by a single machine, with no intervention by the operator, except to adjust the rice feed, the supplies of water, steam and air, and to possibly adjust the speeds of the conveyor belts 1 and 29.

A circuit for the recycling of hot air may be provided in both the chamber 15 and in the chamber 30.

Figure 5:
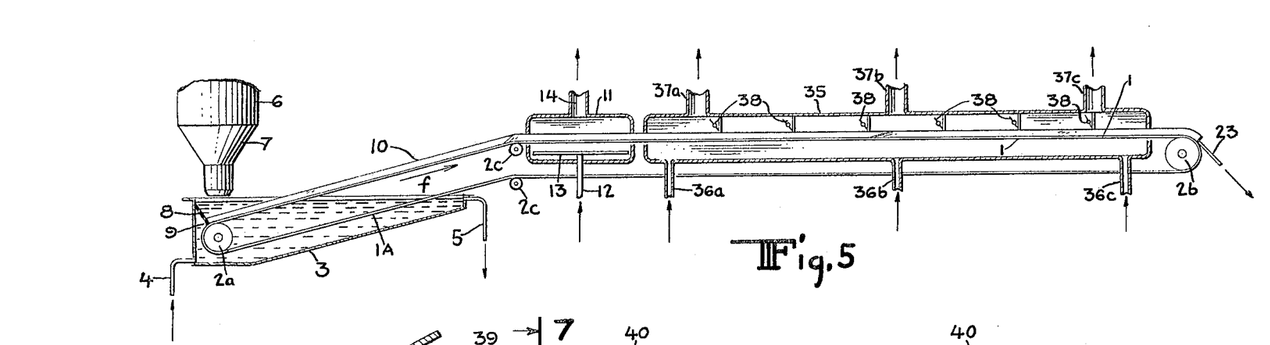
FIG. 5 is a diagrammatic longitudinal section of an apparatus constructed according to another embodiment.
Figure 6:
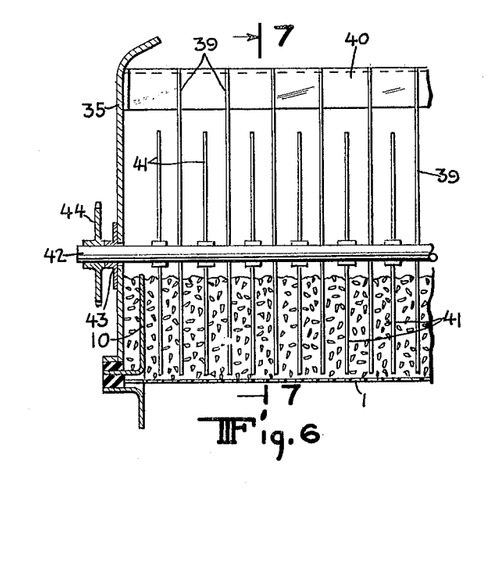
FIG. 6 is an enlarged view, one half of an assembly of a fixed and moving comb mounted inside of the drying chamber.
Figure 7:
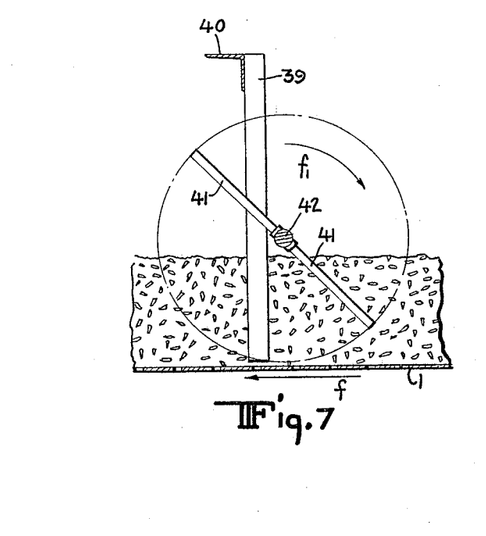
FIG. 7 is a view in cross-section taken in the direction of line 7—7 of FIG. 6.

The embodiment shown at FIGS. 5, 6 and 7 comprises, up to and including cooking chamber 11, the same general arrangements as the above described apparatus, the same members being indicated by the same reference numerals. The perforated conveyor belt 1A is longer than in the above described examples and at the exit of chamber 11, the upper strand of said belt goes through a drying chamber 35 the general form of which, as far as the construction of its walls, its entry and its outlet portions are concerned, is identical with that of the above described pre-drying chamber 15, the chamber 35 being, however, longer than in the previous case. It is provided on its lower face with three conduits 36a, 36b, 36c for the inlet of hot air and, on its upper face, with three conduits 37a, 37b, and 37c for the evacuation or removal of air. The chambers 11 and 35 should preferably be heat-insulated by any suitable known means.

Transversely inside the chamber 30 are arranged six stirring members shown diagrammatically in FIG. 5 and which are given, in a general manner, the reference numeral 38 in the said figure. As shown in FIGS. 6 and 7, each of these members includes a fixed comb formed by the vertical blades 39 fixed to a horizontal angle-iron 40 mounted in the upper portion of the chamber 35 at right angles to the longitudinal axis of the latter. A moving comb cooperates with said fixed comb, said moving comb being formed by parallel rods 41 located in the same plane and mounted on each side of shaft 42, said rods 41 being at right angles to the axis of shaft 42. Shaft 42 can be rotatably supported in bearings 43 mounted in lateral walls of chamber 35, said rods 41 being located half-way between the blades 39. The free extremities of blades 39 are almost in contact with the upper surface of the perforated belt 1A, and the length of the rods 41 is such that during the course of rotation of the shaft 42, their free extremities also pass practically in contact with this surface. On one of the extremities of the shaft 42 is keyed a pinion 44 which cooperates with a chain (not shown) which is common to the shafts 42 of all the stirrers 38 and actuated by a driving mechanism (also not shown) such that the shafts 42 are given a speed of rotation which is relatively slow in the direction shown by the arrow $f_1$ of FIG. 7.

The distance between two adjacent blades 39 and between two adjacent rods 41, which is obviously the same for any given stirring device 38, is progressively reduced from one stirring device to the other in the direction of travel of the belt 1, this spacing being, for example, 5 centimeters for the stirrer situated nearest to the entry of the chamber 35, and then, for example, respectively 4 cm., 3.5 cm., 3 cm., 2.5 cm., and 2 cm. for succeeding stirrers.

On the part of the perforated belt 1A which passes around the roller 2b is located a plate 23, acting as a scraper and intended to direct the treated rice towards a storage place or a conditioning apparatus of any desired type, which does not form part of the present invention and which is consequently not shown.

In the form shown in FIGS. 5 to 7, inclusive, the rice is placed in the dry and raw state in the hopper 6 and is discharged onto the perforated belt 1A so as to form on the belt a layer of about 10 cm. in thickness. The rice then is soaked, drained and cooked in the same way as above described. The layer of cooked rice passes without being disturbed into the drying chamber 35, into which hot air at a temperature of about 90° C., is introduced through the conduits 36a, 36b and 36c. At the beginning of its passage through the chamber 35, the layer of rice which has still not been disturbed and the humidity content of which is about 28%, is subjected to a first drying up to a humidity content of about 18%, at which it is in a condition such that it possesses a certain elasticity which enables it to be ginned without risk of breaking it too much, the time required to reach this condition being about five minutes. At this moment, the mass of cooked rice comes into contact with the first stirring device 38 which is arranged at the desired distance from the entry of the chamber 35, and which produces a first division of the mass in which the grains are thus separated from each other. This division is continued by the following stirring devices 38 with which the mass of rice comes into contact at intervals of time of about five minutes, the reduction in the distance between the blades 39 or between the rods 41 of the stirring devices enabling a closer and closer stirring to be obtained, giving in consequence an increasingly fine division, until all the grains are completely separated from each other. The stirring action thus produced has the effect not only of ginning the mass of cooked rice, but also of subjecting it to a mixing action and internal movement which accelerates the drying action and thus reduces the duration of this latter in a proportion which may attain 50% with respect to the drying period of a motionless layer. This reduction in the period of drying enables the length of the drying chamber 35 to be reduced, since this length is calculated in order that the rice discharged from the said chamber may have a degree of dryness required for its conditioning, that is to say of about 10 to 12%, and being, for example, of about 4 meters up to 10 or 12 meters in length, depending on the speed of travel of the conveyor belt and the hourly production capacity desired.

At the outlet of the drying chamber, the cooked and dried rice falls on to the plate 23 in the condition of perfectly separated grains.

In a case in which it is desired immediately to put the rice into packets after it has left the perforated conveyor belt 1, it is desirable to subject it to a preliminary cooling. To this end, there may be arranged in the chamber 35, at a short distance from the last stirring device 38, a transverse partition provided with a flexible strip (not shown) which bears on the layer of rice in order to ensure a sufficient degree of air-tightness. Thus, there can be formed at the extremity of the chamber 35, an isolated enclosure into which cold air is injected through the conduit 36c instead of hot air. It is possible that, in this case, it may be preferable to arrange a supplementary air-removal conduit (not shown) on the downstream side and in the vicinity of the said transverse partition in order to effect the discharge of the drying air which has passed through the mass of rice on the downstream side of this partition. The length of the isolated enclosure thus constituted can be calculated so that the rice leaves the enclosure, always in the desired state of dryness, but substantially at ambient temperature.

In both the above described embodiments, the conveyor belt, instead of being in one single length may be divided into two parts (not shown). When so divided, one portion may comprise a part corresponding to the phases of soaking, draining and rest, and the other which corresponds to the cooking and drying stages. In this way, the space occupied by the length of the apparatus may be reduced by arranging the soaking tank, with the corresponding soaking and draining portion of the conveyor belt, above the assembly constituted by the cooking and drying chambers, the rice which is soaked, drained and impregnated throughout with water, being discharged on to the conveyor belt which passes through the said chambers.

The process and device according to the present invention thus offer great advantages over the methods for industrial cooking known heretofore, both as regards the quantitative and qualitative yields and as regards the cost price of the finished product. The entire cooking and drying operation for 1 kilogram of rice, requires a maximum of 1.5 kg. of steam, including the steam necessary for heating the air; the complete cycle of processing having a duration of about 120 to 140 minutes. The yield in weight of cooked product, with a perfect commercial quality, as compared to the raw materials may be of the order of 92%.

The apparatus shown at FIGS. 5, 6 and 7 enable all of the industrial operations of pre-cooking to be carried out in a continuous manner and in a single machine without the treated material leaving the belt or band on which it is carried, during the whole period at which any transfer would have an adverse effect. This machine, which may be produced in the form of a monoblock assembly, enables all the operations of pre-cooking to be carried out, starting from raw material, rice, dried vegetables or cereals, such as may be currently found in commerce, so as to produce a pre-cooked product with a humidity of 10/11%, cooled and ready to be packed in bags or in packets, under the supervision of a single operator. By a simple modification of the dimensions of the apparatus, in length and/or in width, it is a simple matter to produce machine assemblies which will give hourly production rates to satisfy the needs of each particular case within wide limits. The process of manufacture is carried out continuously in two adjacent and heat-insulated chambers and, with regard to the final drying stage, the mass being stirred and turned over almost continuously, which ensures a very rapid exchange of heat, the heat balance sheet being extraordinarily favorable. Experience has shown that the amount of fuel required for the manufacture of 100 kg. of pre-cooked rice is a maximum of 6 to 8 kg. of fuel oil, as normally found in commerce.

The embodiment of the apparatus shown in FIGS. 8 to 12, inclusive, includes a soaking tank 50 provided with a water supply conduit 51 and an evacuation conduit 52, and in which is mounted a heating coil 53 connected to a source of steam. The product to be treated is fed to the tank 50 by an Archimedean screw 54 driven by any known means and arranged to be supplied either from a stone-removing device 55 of a known type, or from a simple hopper 56. An inclined conveyor belt 57 travelling on rollers 58 and 59 passes through the tank 50, the belt being driven by any known means. The conveyor belt 57 delivers the product onto a second conveyor belt 60 travelling on rollers 61 and 62, the upper and lower sides of this belt being supported by free rollers 63. The other extremity of this belt 60 discharges above a rolling device formed by two rollers 64, the surface of which may be provided with flutes and which are mounted so that the space between them may be varied. The rollers may be driven by any known means.

Figure 8:
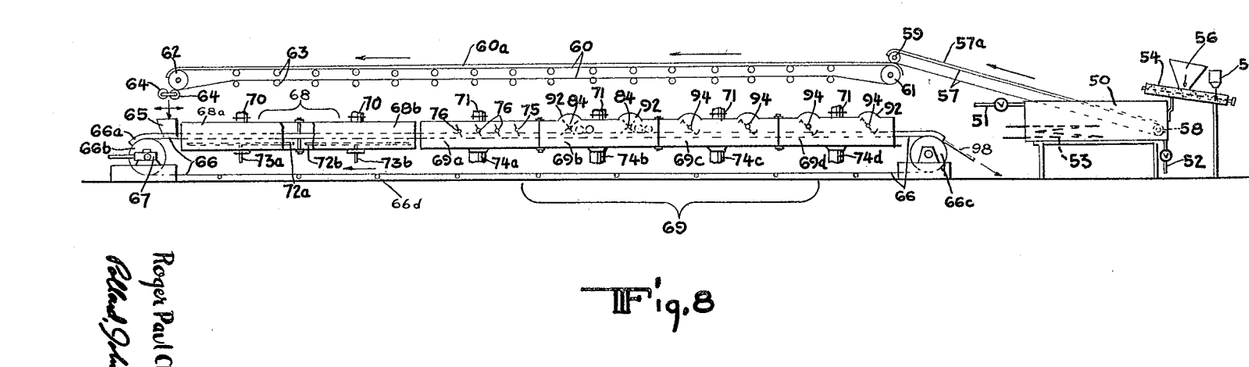
FIG. 8 is a diagrammatic side elevational view of an apparatus constructed according to another embodiment.

Under the rollers 64 is a hopper 65 which delivers the granular particles onto an endless vapor permeable conveyor belt 66 passing over end rollers 66b and 66c. The roller 66c is driven by a motor (not shown), while the roller 66b is carried by a device shown diagrammatically at 67 so that the tension of the belt 66 may be regulated. Intermediate rollers 66d support the lower side of this conveyor belt 66. Although the conveyor belts 57 and 60 are preferably continuous full bands of rubber or similar material, the belt 66 is perforated, the holes being of diameter less than the dimensions of the grains of the products to be cooked. Belt 66 may be made of perforated stainless steel sheet in the form of a continuous band or in the form of plates articulated to each other at their extremities, or by a strip of stainless metallic gauze. The belts 57, 60 and 66 move between two side walls indicated for the respective belts at 57a, 60a and 66a, and intended to retain the layer of product on each side of the belts.

The upper side of the belt 66 passes successively through a cooking chamber 68 and a drying chamber 69. The said cooking and drying chambers include several compartments of the same general construction arranged end to end, each of said compartments including end walls pierced with openings to permit the passage of the belt and a layer of product to be treated arranged on said belt. The cooking chamber thus includes two compartments 68a and 68b, while the drying chamber includes four compartments 69a, 69b, 69c and 69d.

The general arrangement of these compartments is similar to that of the cooking and pre-drying chambers of the embodiment shown in FIGS. 1 and 5. They all include an evacuation conduit 70 for the compartments 68a and 68b, and 71 for the compartments 69a to 69d. At the bottom of the cooking compartments 68a and 68b, below the upper side of the belt 66 are arranged longitudinal nests of steam-distribution tubes 72a and 72b, the tubes being perforated at their upper surfaces and being coupled by the intake conduits 73a and 73b to a source of steam which preferably enables a super heat to be obtained. The steam emitted from the tubes is at substantially atmospheric pressure, as previously set forth.

The compartments 69a to 69d have air intake conduits 74a to 74d below the belt which are coupled to devices capable of supplying hot air at a very slight over pressure. The compartments 68a and 68b are contiguous as are the compartments 69a to 69d, while a space may be provided between compartment 68b and compartment 69a.

Figure 9:
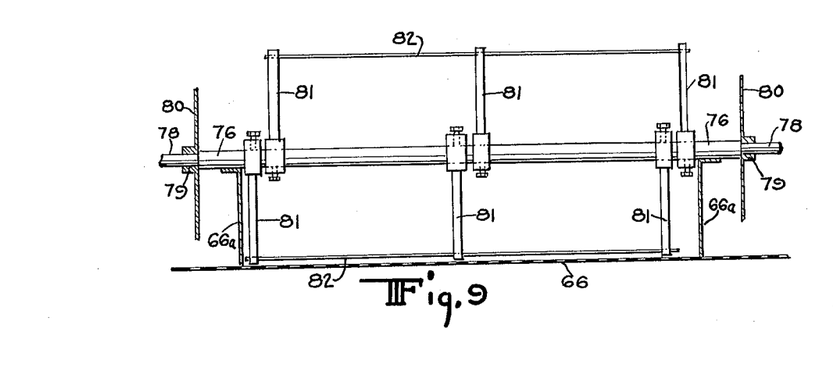
FIG. 9 is an enlarged front elevational view of the stirring device used in the first drying compartments of the embodiment of FIG. 8.
Figure 10:
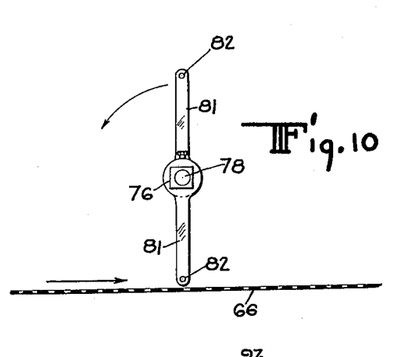
FIG. 10 is a side elevational view of the stirring device of FIG. 9.

In compartment 69a are arranged three rotary mixers, of which one is shown in detail in FIGS. 9 and 10, and an agitator of which only the driving shaft 75 can be seen in FIG. 8, which agitator is identical with the agitator separator devices 38 of FIG. 5. Each of the mixers comprises a square shaft 76 terminating in trunnions 78 rotatably mounted in bearings shown diagrammatically at 79 and supported by wall 80 of the compartment. One of these trunnions 78 carries a pinion (not shown) which permits the driving of the mixer by means of a chain, not shown. On the square shaft 76 diametrically opposed arms 81 are keyed which support at their free ends two stretched metallic wires 82. The shafts of the mixers are arranged in a uniformly spaced manner transversely of the compartment 69b so that a certain free space is formed in the said compartment between its inlet and the first mixer.

Figure 11:
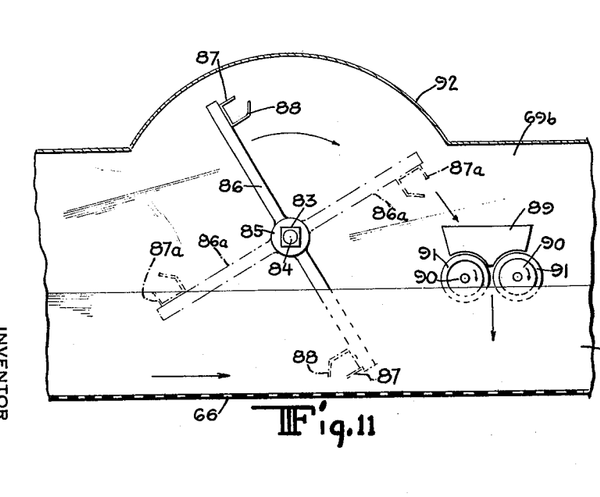
FIG. 11 is a side elevational view of the agitating means used in the second drying compartment of the embodiment of FIG. 8.
Figure 12:
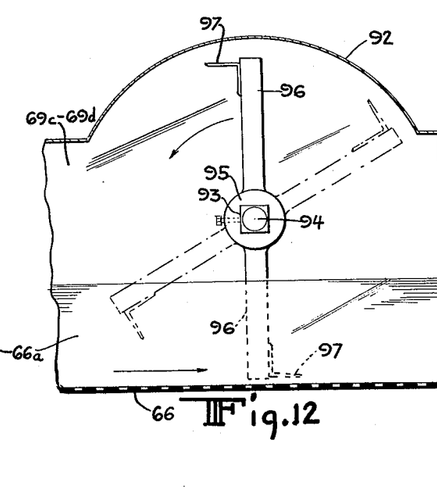
FIG. 12 is a side elevational view of the stirring device used in the last drying compartment of the embodiment of FIG. 8.

In compartment 69b two shelling devices are provided, one of which is shown in detail in FIG. 11. This device includes an elevating device comprising a square shaft 83 terminating at each end in trunnions 84 mounted in a similar manner to trunnions 76 of the mixers of compartment 69a. On shaft 83 are keyed three sleeves 85 uniformly spaced apart along the shaft, and carrying two diametrically opposed arms 86. Arms 86 carry troughs 87 at their ends. These troughs are formed by members in the form of gutters of rectangular section extending parallel to the shaft 83, the wall of each gutter closest to shaft 83 being extended by an oblique wall 88. If desired, three other sleeves identical with sleeve 85 can be arranged on the shaft 83 and carry arms 86a supporting troughs 87a, as shown in dotted lines in FIG. 11, arms 86a being arranged at right angles to the arms 86. Immediately ahead of each of the elevating devices is the shelling device proper. This includes a hopper 89, the lower part of which discharges above and between two rollers 90. The spacing between the rollers 90 is adjustable and the rollers are independently driven in opposite directions at adjustable speeds, the said rollers may have a covering 91 of rubber or similar material. Both the hopper and the rollers 90 extend transversely over the entire width of the belt 66. The trough elevators have, in the example shown, a diameter greater than the height available between the belt 66 and the top of the compartment 69b. Therefore, free spaces are formed in the top so as to permit the passage of the upper parts of the elevating devices. The free spaces are covered by casing members 92 (see FIG. 8).

Finally, in each of the compartments 69c and 69d two mixing devices are arranged which includes a square shaft 93 terminating in trunnions 94 mounted in exactly the same way as trunnions 78 and 84. At each end of shaft 93 are keyed two sleeves 95 carrying diametrically opposed arms 96 which support at their free extremities two angle pieces 97 extending over the entire width of the belt 66. Casing members 92 are also provided at the upper portions of the compartments 69c and 69d in order to provide a housing for the mixing devices thus formed.

In each of the compartments 69a to 69d, the mixing devices or elevators are arranged so that the wires 82, the troughs 87 or the angle pieces 97 pass, during the rotation of the corresponding shafts, in close proximity to the belt 66. The assembly formed by shafts 75, 76, 83 and 93 may be driven through a chain transmission, from a common motor which may be the same as that which drives conveyor belt 66. This motor and also those which drive the Archimedean screw and conveyor belts 57 and 60 should be provided with a speed varying device which may be either a device acting on the speed of rotation of the motor or a speed varying gear interposed between the motor and the member or members which it drives.

The apparatus operates in the following manner:

The product to be treated is introduced either into the stone removing washer 55 or, if its state of cleanliness is adequate and if there is no risk of it containing foreign substances such as gravel, into the hopper 56. It is taken up by the Archimedean screw 54 which discharges it into the water filled soaking tank 50. The water may be heated by means of the coil 53, when required. The product falls onto belt 57 which moves at a predetermined speed, and forms thereon a layer having a substantially uniform thickness. On the portion of the belt 57, which is located outside the tank, the product is subjected to a draining operation which frees it from excess water. During this draining, penetration of the water into the interior of the product continues. The mass of product, which still retains a certain quantity of water between the grains, is discharged onto conveyor belt 60, the speed of movement of which is also predetermined, and is given on that belt a time of rest during which the penetration of the water through the grains is completed. After this period of rest the product falls from the end of belt 60 into hopper 65, after having been subjected, when desired, to a slight flattening by passing through rollers 64. For certain products such as wheat, barley, oats, peas, beans or maize, especially when these latter products are intended to be subsequently converted into flour, there may be an advantage in subjecting them to such a flattening action to assist and accelerate their cooking. If the product is not to be flattened, the rollers 64 are moved away from each other so that the product passes between them without being subjected to their action. From hopper 65 the product is carried away by belt 66 in the form of a layer of uniform thickness, this thickness being, for example, of the order of 10 cm. The layer thus formed passes into the cooking chambers where steam at atmospheric pressure passes through the perforated belt and the layer thereon, as described above. The layer then is carried into the drying chamber. In the first compartment 69a the product is subjected, before being mixed, to a pre-drying which brings the grains of product to the optimum degree of humidity and temperature as set forth above. The mixers 76 to 82 contained in compartment 69a are rotated at a low speed, on the order of 12 to 14 r.p.m. These mixers cut through the layer of product which is present on the belt 66 without an abrupt shock, thereby ensuring a first separation of the grains which assists their being brought into contact with the hot air blown into the compartment. The grains are subjected to a subsequent separation in the same compartment by the comb device of the type shown in FIGS. 5, 6 and 7. However, all of the mixers and the comb device may not ensure a total separation of the grains, which may still be in the form of small agglomerated lumps. The grains thus partly separated then pass into compartment 69b, wherein they are picked up by troughs 87 of the first elevator and carried upwardly. Due to the special form of the troughs and especially to the presence of the oblique wall 88, the grains are discharged into hopper 89 which precedes shelling rollers 90. The grains, which may still be partly agglomerated, then pass between rollers 90 which rotate at different speeds, thereby ensuring the total separation of the grain. The product thus shelled passes finally into compartments 69c and 69d of the drying chamber, wherein the grains are actively mixed by angle pieces 97 which lift and drop the grains, thus accelerating the drying action and making it uniform. The resultant product, pre-cooked and dried to the desired degree, is collected at the end of belt 66. An inclined table 98, one edge of which engages the conveyor belt 66 at the point where it passes over the roller 66b, enables the product to be directed towards any desired packing device.

As has already been explained, the times of soaking, standing, cooking and drying vary considerably, depending on the nature of the product to be treated. By virtue of the construction of the apparatus of FIGS. 8 to 12, it is possible, without any modification of the apparatus, to vary these various times of treatment within any desired limits. This is accomplished by the fact that the speed of movement of conveyor belts 57, 60 and 66 can be regulated independently, by the fact that it is possible to isolate steam distribution conduit 72a of cooking compartment 68a, using only compartment 68b for the cooking operation, and by the fact that drying compartment 68d can be put out of service or this compartment can be used for the cooling of the product by introducing cold air instead of hot air into conduit 74d.

In order to modify the soaking time of the product, it is either possible, as has already been stated above, to vary the speed of travel of belt 57, or the level of water in the tank. Finally, it is possible to vary the temperature of the water, since certain products must be soaked at relatively high temperatures; thus, for example, soft rice should be soaked at a temperature between 15 and 20° C. and for a time which may vary from 12 to 15 minutes, while peas and beans should be soaked for a period of from 15 to 20 minutes at a temperature of from 60 to 75° C. In the case of lentils, the time of soaking is the same as for peas and beans while the temperature need only be about 40° C. Corn or maize, which is one of the most difficult to pre-cook, should be soaked for a period of up to 30 minutes in water at a temperature from about 75 to 80° C.

As has already been explained, the products to be treated, whatever they may be, must after having been drained of excess water be left at rest before being subjected to pre-cooking for a sufficient time to permit the water retained between the grains to penetrate to the center of the grains. The time required for this penetration obviously varies in accordance with the nature of the product treated. Thus for example, in the case of rice, thirty minutes of rest is sufficient. Lentils should rest for at least one hour, peas, wheat, and barley from two hours to two and a half hours, and corn up to three hours.

By virtue of the arrangement of the conveyor belt 60, it is possible to obtain the necessary time and rest periods for all products treated by simply varying the speed of travel of that belt.

Finally, as has also been previously explained above, the times of cooking and drying can be varied at will by regulating the speed of travel of conveyor belt 66 and the number of cooking compartments in service. It should be observed that, while in the example chosen the number of compartments forming the cooking chamber is four, it is obviously possible to use an installation including a lesser or a greater number of compartments.

By way of example, the table given below gives the cooking times necessary for various products:

| Products | Cooking Time minutes | Temperatures, °C. |
|---|---|---|
| Rice | 15 | 105–110 |
| Wheat | 30 | 110–120 |
| Barley | 30 | 110–120 |
| Peas | 30 | 105–110 |
| Lentils | 30 | 105–110 |
| Beans | 30 | 105–110 |
| Corn | 30–40 | 115–120 |

From this table it can be seen that since the cooking time of rice is equal to about half the cooking time of the other products, there is an advantage in the case of rice in using only one cooking compartment, preferably compartment 68b, by putting compartment 68a out of service.

One of the major advantages of the process of this invention in all of its various forms is that it is continuous. The continuous character of the process is, at least in part, due to the fact that the cooking is carried out with free steam, i.e. steam at approximately atmospheric pressure, thereby eliminating the need for an autoclave or similar pressure cooking device which, as a practical matter, requires a batch process.

The devices described above should be considered only as mere examples of the embodiments and it should be apparent that numerous modifications of details may be made in its construction within the scope of the invention and in addition to those which have already been mentioned as possible.

What is claimed is:

1. A process of continuously producing pre-cooked rice, comprising the steps of moving a layer of uncooked rice grains equivalent to 10 cm. thickness through water for a period equivalent to about 10–15 minutes to initiate an increase in moisture content thereof; moving said layer of rice grains in an undisturbed condition out of said water to permit the draining of excess water therefrom for a period of time sufficient to permit diffusion of the water retained thereon to provide a moisture content of the rice grains to within a range of about 20–25%; passing steam at about 105–110° C. through said layer of grains for a period of about 15 minutes; maintaining said layer of rice grains in an undisturbed condition and drying the same until the water content thereof is in the order of about 18–20%; agitating the grains of rice after they have achieved the last mentioned water content; and finally passing drying air through said grains until the water content thereof is about 10–12%.

2. A process of continuously producing pre-cooked rice, comprising the steps of moving a layer of uncooked rice grains equivalent to 10 cm. thickness through water for a period equivalent to about 10–15 minutes to initiate an increase in moisture content thereof; moving said layer of rice grains in an undisturbed condition out of said water for a period of between about 20–30 minutes; passing steam at about 105–110° C. through said layer of grains for a period of about 15 minutes; maintaining said layer of rice grains in an undisturbed condition and drying the same until the water content thereof is in the order of about 18–20%; agitating the grains of rice after they have achieved the last mentioned water content; and finally passing drying air through said grains until the water content thereof is about 10–12%.

References Cited in the file of this patent

UNITED STATES PATENTS

| | | |
|---|---|---|
| 1,446,200 | Mulkey | Feb. 20, 1923 |
| 2,498,573 | Ozai-Durrani | Feb. 21, 1950 |
| 2,525,137 | Jones et al. | Oct. 10, 1950 |
| 2,551,148 | McBeth | May 1, 1951 |
| 2,571,555 | Fernandes | Oct. 16, 1951 |
| 2,638,837 | Talmey et al. | May 19, 1953 |
| 2,638,838 | Talmey et al. | May 19, 1953 |
| 2,715,579 | Roberts | Aug. 16, 1955 |
| 2,740,719 | Ozai-Durrani | Apr. 3, 1956 |
| 2,937,946 | Ozai-Durrani | May 24, 1960 |